(12) United States Patent
Badam

(10) Patent No.: US 12,512,970 B2
(45) Date of Patent: Dec. 30, 2025

(54) CRYPTOGRAPHIC KEY HIERARCHY

(71) Applicant: Microsoft Technology Licensing, LLC, Redmond, WA (US)

(72) Inventor: Balaji Ravi Kumar Badam, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 18/211,983

(22) Filed: Jun. 20, 2023

(65) Prior Publication Data
US 2024/0430078 A1    Dec. 26, 2024

(51) Int. Cl.
*H04L 9/08* (2006.01)
*H04L 9/14* (2006.01)

(52) U.S. Cl.
CPC .......... *H04L 9/0836* (2013.01); *H04L 9/0869* (2013.01); *H04L 9/14* (2013.01)

(58) Field of Classification Search
CPC ........ H04L 9/0836; H04L 9/0869; H04L 9/14
See application file for complete search history.

(56) References Cited

U.S. PATENT DOCUMENTS

| | | | |
|---|---|---|---|
| 9,742,563 B2 | 8/2017 | Gotze et al. | |
| 10,521,618 B1 * | 12/2019 | Zhang | H04L 9/0643 |
| 11,159,318 B2 | 10/2021 | Maim | |
| 11,228,421 B1 * | 1/2022 | Mesh | G06F 21/36 |
| 2015/0082048 A1 | 3/2015 | Ferguson et al. | |
| 2015/0263855 A1 * | 9/2015 | Schulz | H04L 9/0827 |
| | | | 713/155 |
| 2018/0307626 A1 * | 10/2018 | Chessin | H04L 9/0897 |
| 2021/0273800 A1 * | 9/2021 | Hassani | H04L 9/3242 |

FOREIGN PATENT DOCUMENTS

CN    101635623 A    1/2010

OTHER PUBLICATIONS

International Search Report and Written Opinion received for PCT Application No. PCT/US2024/034415, Sep. 30, 2024, 12 pages.
"Security Subsystems for Systems-on-Chip (SoCs)", Retrieved from: https://www.nxp.com/docs/en/white-paper/Security-Subsystems-WP.pdf, Retrieved Date: Apr. 6, 2023, 16 Pages.

* cited by examiner

*Primary Examiner* — Shanto Abedin
(74) *Attorney, Agent, or Firm* — Shook Hardy & Bacon L.L.P.

(57) ABSTRACT

The technology described herein generates cryptographic keys for a system on-chip (SoC). The technology uses a cryptographic key hierarchy to generate cryptographic keys as needed and in constant time. The cryptographic key hierarchy uses a cryptographic key from a parent node as an input to the cryptographic function used to generate cryptographic keys associated with child nodes of the parent node. A single cryptographic key or batch of cryptographic keys may be generated as needed in response to a trigger event. Each key may be generated using a prescribed amount of iterations performed across the various hierarchical levels of the cryptographic key hierarchy. The amount of iterations performed at each level may be determined on a chip-by-chip basis. The unique identifier on a SoC may also be used as an input to the cryptographic function. Using the unique identifier as an input to the cryptographic function generates SoC-specific cryptographic keys.

20 Claims, 5 Drawing Sheets

CRYPTOGRAPHIC KEY HIERARCHY

CROSS-REFERENCE TO RELATED APPLICATIONS

None.

BACKGROUND

Modern computer systems are susceptible to cyberattacks. The increase in attacks has increased the importance of creating a secure hardware platform that is resilient to security attacks. Security by default is one philosophy for increasing resiliency to attack. Security by default products are those that are secure to use out of the box, with little to no configuration changes. Security by default products may include features such as multi-factor authentication (MFA), encryption, automatic security event logging and reporting, and controlling access to sensitive information. Defense in depth is a second philosophy for securing computer systems. Defense in depth uses multiple layers of security, such as those listed above. If one defense is compromised, then other available defense layers may be able to stop the threat.

However, each security technology deployed uses scarce computing resources, such as processing and memory capacity. Computing resources may be especially scarce on system-on-chip (SoC), which may be optimized for the performance of a single task. The use of these scarce resources for security methods leaves fewer resources for applications, which may negatively influence performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein generates cryptographic keys for a system on-chip (SoC). The technology uses a cryptographic key hierarchy to generate cryptographic keys as-needed and in constant time. The cryptographic key hierarchy uses a cryptographic key from a parent node as an input to the cryptographic function used to generate cryptographic keys associated with child nodes of the parent node. Once generated, the lower level cryptographic keys may be used to encrypt memory or to aid the CPU in securing other entities or resources on the SoC as needed.

A single cryptographic key or batch of cryptographic keys may be generated as needed in response to a trigger event. The as-needed generation improves upon the security of existing cryptographic key generation methods by avoiding the need to store a large group of cryptographic keys in memory on a SoC. An example trigger event is the opening of a new application on the SoC. Memory may be allocated to the application upon opening and an cryptographic key may be used to prevent other applications running on the SoC from reading content in the memory allocated to the new application.

Each cryptographic key may be generated in constant time to avoid generating a signal that may help a bad actor decipher a cryptographic key. Each key may be generated using a prescribed amount of iterations performed across the various hierarchical levels of the cryptographic key hierarchy. Security may be further improved by altering an amount of iterations performed at each level on a chip-by-chip basis. The per-hierarchical level number of iterations may be determined on a chip-by-chip basis using a unique identifier for the chip. The unique identifier on a SoC may also be used as an input to the cryptographic function. Using the unique identifier as an input to the cryptographic function generates SoC-specific cryptographic keys.

BRIEF DESCRIPTION OF THE DRAWINGS

The technology described herein is illustrated by way of example and not limitation in the accompanying figures in which like reference numerals indicate similar elements and in which.

DETAILED DESCRIPTION

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein generates cryptographic keys for a system on-chip (SoC). The technology uses a cryptographic key hierarchy to generate cryptographic keys as needed and in constant time. The cryptographic key hierarchy uses a cryptographic key from a parent node as an input to the cryptographic function used to generate cryptographic keys associated with child nodes of the parent node. For example, a root key may be used as an input to generate a plurality of cryptographic keys that form an upper level of the cryptographic key hierarchy. Each cryptographic key in the upper level may in turn be used as inputs to generate a plurality of keys forming an intermediate level. Each cryptographic key in the intermediate level may be used to generate a plurality of keys forming a lower level. Once generated, the lower level cryptographic keys may be used to encrypt memory or to aid the CPU in securing other entities or resources on the SoC as needed.

A single cryptographic key or batch of cryptographic keys may be generated as needed in response to a trigger event. The as-needed generation improves upon the security of existing cryptographic key generation methods by avoiding the need to store a large group of cryptographic keys in memory on a SoC. Storing pre-generated cryptographic keys put these keys at risk of discovery by a bad actor. Generating the keys as needed avoids the need to store the keys on the SoC prior to their use. An example trigger event is the opening of a new application on the SoC. Memory may be allocated to the application upon opening and an cryptographic key may be used to prevent other applications running on the SoC from reading content in the memory allocated to the new application.

Each cryptographic key may be generated in constant time to avoid generating a signal that may help a bad actor decipher a cryptographic key. As used herein, constant time means performing an action using the same amount of processor operations. In particular, each cryptographic key is generated by executing a cryptographic function the same total amount of iterations. Each key may be generated using a prescribed amount of iterations performed across the various hierarchical levels of the cryptographic key hierarchy. For example, each lower key may be generated using a total of 64 iterations across all iterations in the hierarchical path of keys that leads to the lower key.

Security may be further improved by altering an amount of iterations performed at each level on a chip-by-chip basis. The per-hierarchical level number of iterations may be determined on a chip-by-chip basis using a unique identifier for the chip. The unique identifier may be placed on the chip during the manufacturing operation and may only be accessible to a processor on the chip. In one example, the amount of iterations on the upper level of the hierarchy is determined using the four least significant digits of the unique identifier. The amount of iterations on the intermediate level of the hierarchy may be determined using the ninth through fifth least significant digits in the unique identifier. The amount of iterations in the lower (and final) level may be a designated amount (e.g., 64) less the sum of the iterations performed while generating keys in the hierarchical path leading to the key being generated.

A unique identifier on a SoC may be used as an input to the cryptographic function. Using the unique identifier as an input to the cryptographic function generates SoC-specific cryptographic keys. The unique identifier may be combined with a random secret at every power up of the SoC to create a power-cycle specific unique identifier that is only valid for that power cycle. This further diversifies the keys that are generated and makes them unique every power cycle. Either the power-cycle specific unique identifier or the random identifier may be used as a unique identifier herein.

The technologies herein are described using key terms wherein definitions are provided. However, the definitions of key terms are not intended to limit the scope of the technologies described herein.

A system-on-chip integrates the components of an electronic system, such as a computer into a single integrated circuit or chip. It may contain digital, analog, mixed-signal, and radio-frequency functions. A typical SoC can include a microcontroller, microprocessor or digital signal processor (DSP) cores. Some SoCs, referred to as multiprocessor System-on-Chip (MPSoC), include more than one processor core. Other components include memory blocks, such as ROM, RAM, EEPROM and Flash, timing sources (e.g., oscillators and phase-locked loops), peripherals (e.g., counter-timers, real-time timers and power-on reset generators), external interfaces (e.g., USB, FireWire, Ethernet, USART, SPI, and analog interfaces, such as analog-to-digital converters (ADCs) and digital-to-analog converters (DACs)), and voltage regulators and power management circuits. Example applications for SoC include music players and video game consoles, among many other possible applications.

An operating system is a program (or set of programs) that manages the resources on a computing device. Typically, the operating system offers these resources to a user through programs called applications. Applications perform tasks such as word-processing, gaming, internet activities, etc. The operating system is an intermediary between the applications and the computer hardware. Operating systems have libraries of programs that applications can use to create standardized user interaction.

An encrypter is an algorithm, software application, or device that encrypts data, such portions of memory. Encryption is the process of converting or scrambling data and information (plain text) into an unreadable, encoded version (cipher text) that can only be read with a cryptographic key.

A cryptographic key is be a set of values. Data can be encrypted "at rest," when it is stored, or "in transit," while it is being transmitted somewhere else.

Decryption is the reverse process of encryption. It is a procedure of transforming cipher text into plain text. Cryptography uses a decryption technique at the receiver side to acquire the original message from cipher text. Decryption operates by using the opposite conversion algorithm used to encrypt the data. The same cryptographic key is used to return the encrypted data to its original form. In decryption, the system extracts and transforms the encrypted data to text and images that are comprehensible to a user.

Pseudo Random Function: Pseudo Random Function (PRF) is a deterministic function that produces a random output. An example of a PRF is a keyed Flash-based Message Authentication Code (FIMAC). A PRF may be used as a cryptographic function.

Having briefly described an overview of aspects of the technology described herein, an operating environment in which aspects of the technology described herein may be implemented is described below in order to provide a general context for various aspects.

Figure 1:
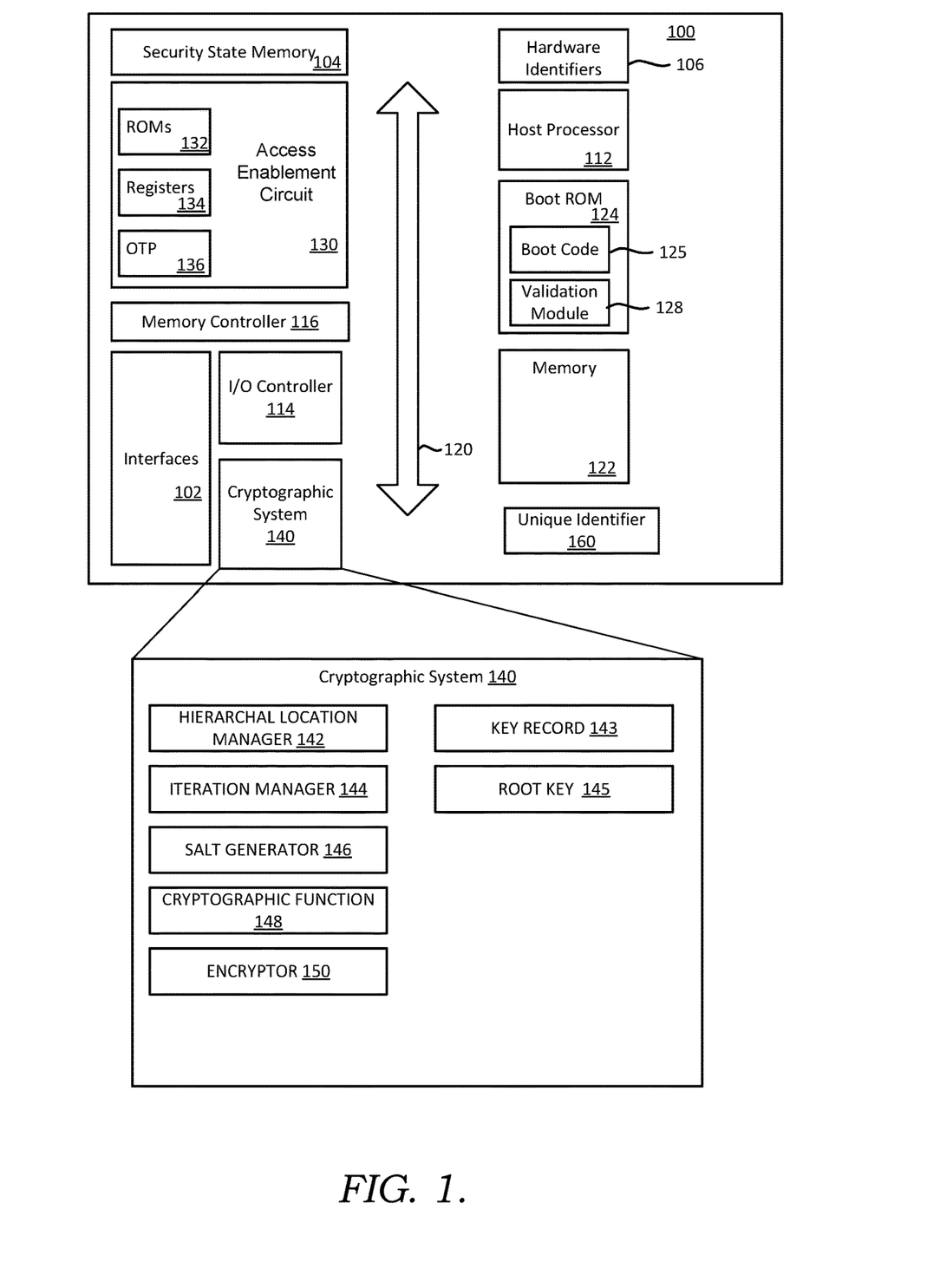
FIG. 1 is a diagram of a system-on-chip suitable for implementations of the technology described herein.

FIG. 1 illustrates an example of a system-on-chip (SoC) 100 that uses a hierarchical-cryptographic key system to generate cryptographic keys for use on the SoC. SoC 100 includes a host processor 112, an input/output (I/O) controller 114, a memory controller 116, and cryptographic system 118 that can communicate with one another via a bus 120. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus, and the Advanced Microcontroller Bus Architecture (AMBA) bus. DMA controllers which route data directly between external interfaces and memory, bypassing the processor core and thereby increasing the data throughput of the SoC can also be used. Although particular components are illustrated in FIG. 1, it is to be appreciated that additional or fewer components can be included in SoC 100. For example, additional controllers or processors, such as graphics processing units can be included, cache memories can be included, and so forth.

Memory controller 116 controls access to and operations for memory 122. Memory 122 can include volatile media (such as random access memory (RAM)) and/or nonvolatile media (such as read only memory (ROM), Flash memory, and so forth). Although a single memory 122 is shown, SoC's may include multiple memories of the same or different types. Memory controller 116 allows different components of SoC 100, such as host processor 112 and cryptographic system 118, to write to and/or read from memory 122. Data and/or instructions can be read from and/or written to memory 122, such as instructions of a program to be executed by cryptographic system 118 or host processor 112, data for a program being executed by cryptographic system 118 or host processor 112, and so forth. Host processor 112 executes one or more programs that provide various functionality of SoC 100, such as audio and/or video recording and/or playback, gaming and/or other recreational functions, and so forth.

I/O controller 114 allows one or more external components or devices to communicate with components or modules of SoC 100. I/O controller 114 operates in a conventional manner to identify signals received via the pins or other connection mechanism of external interfaces 102, and to detect signal values based on the identified signals. These signals can be, for example, changes in voltage levels that indicate digital values of 0 or digital values of 1. In response to detecting a signal value on a pin or other connection mechanism of external interfaces 102, I/O controller 114 provides the detected signal value to another component of system-on-chip 100, typically host processor 112 or cryptographic system 118.

Cryptographic system 118 executes one or more programs that provide cryptographic functionality for SoC 100. This cryptographic functionality can include, for example, encryption and/or decryption of data, generating cryptographic keys, and so forth.

Access enablement circuit (AEC) 130 is a centralized circuit that controls access to the individual security features of SoC 100, for example, as may be exposed over interfaces 102. AEC 130 provides individual control of each security specific feature of SoC 100 from a centralized location. In one example, the AEC 130 controls each security feature as always enabled, always disabled, programmable by cryptographic system 118 or other component, with default on or off, and lockable. The AEC 130 may also control the feature using a complex function based on inputs for the security feature. Each output can include a wire or subset of wires in the circuit that control a particular security feature. With a subset or multiple wire implementation in one embodiment, logic may be used at the destination to determine the state of enablement. In some embodiment, the SoC 100 includes security features not controlled by the AEC 130.

Access enablement circuit 130 includes or accesses ROM's 132 in one embodiment to further control individual security features. For example, the AEC 130 may define a default access control for a security feature using a first ROM and define the influence of software on the security feature using a second ROM. The access control can include a requirement for encryption and decryption. In other examples, other memories can be used to define access control settings and software influences. For example, programmable fuses or SRAM loaded from a software table may be used. AEC 130 additionally includes or accesses a set of data registers 134 in one embodiment. The data registers can be modified by software and/or the security processor 118 in one embodiment to enable, disable, and/or lock a corresponding security feature. The AEC 130 may read the set of data registers to determine an access control setting for a security feature. Finally, AEC 130 includes or accesses a set of one-time programmable fuses 136 in one embodiment that provide additional control over security features. For example, in a particular security state, the OTP fuses may permit the same security feature to have a different behavior based on the OTP bits. In this manner, the OTP fuses can be programmed after manufacture to alter the access control setting for a security feature. As described hereinafter, security certificates may be used to enable or disable access to software programmability of the data registers.

Boot code 125 is typically implemented in Boot ROM 124 that is integrated in the silicon of the SoC 100. The boot code 125 controls a boot sequence and the source of boot programs for the SoC 100. Boot programs may be sourced directly from Boot ROM 124 or from other sources, such as flash memory or over interfaces 102 provided by the SoC, such as SPI in one example.

Boot code 125 executes a validation module 128 to manage security certificates for accessing the security features provided by the various hardware modules of SoC 100. Security certificates may be delivered to the SoC over a network connection, from a trusted certificate provider for example, or over JTAG or other mechanisms. In one embodiment, the validation module verifies security certificates on initial boot of the SoC, but as described, security certificates may be used to execute access control settings at other times as well. The unique identifier 160 is a value unique to the SoC 100. In aspects, the unique identifier 160 is added during manufacture of the chip forming the SoC 100. The unique identifier may be accessible to the host processor 112. The unique identifier 160 may be combined with a random secret at every power up of the SoC to create a power-cycle specific unique identifier that is only valid for that power cycle. This further diversifies the keys that are generated and makes them unique every power cycle. Either the random identifier or the power-cycle specific unique identifier may be used as the unique identifier herein.

The cryptographic system 140 generates cryptographic keys. The cryptographic system 140 includes a hierarchical location manager 142, a key record 143, iteration manager 144, root key 145, salt generator 146, a cryptographic function 148, and encryptor 150.

The hierarchical location manager 142 tracks which cryptographic keys in a cryptographic key hierarchy have been generated within a tracking period. The cryptographic key use may be tracked within a key record 143 that includes representations of locations in the cryptographic key hierarchy. The key record 143 may take the form of a data store. When a key is generated for a particular location then an indication may be associated with the representation indicating that the corresponding key has been generated. In an aspect, the key record 143 does not store the generated keys themselves.

In one aspect, the tracking period starts with power on and ends with power off. In another aspect, the tracking period starts at boot up and is restarted at a subsequent boot up. In another aspect, the tracking period may restart when all keys in the cryptographic key hierarchy have been used even when a primary bounding criteria for the tracking have not been met. This allows all keys in the cryptographic key hierarchy to be regenerated. For example, if the bounding criteria is power up and power down and the SoC 100 does not power down for a long period, the tracking period may be reset. Resetting the tracking period may be accomplished by deleting indications from the key record 143. To better understand locations, an example cryptographic key hierarchy 200 is illustrated in FIG. 2.

Figure 2:
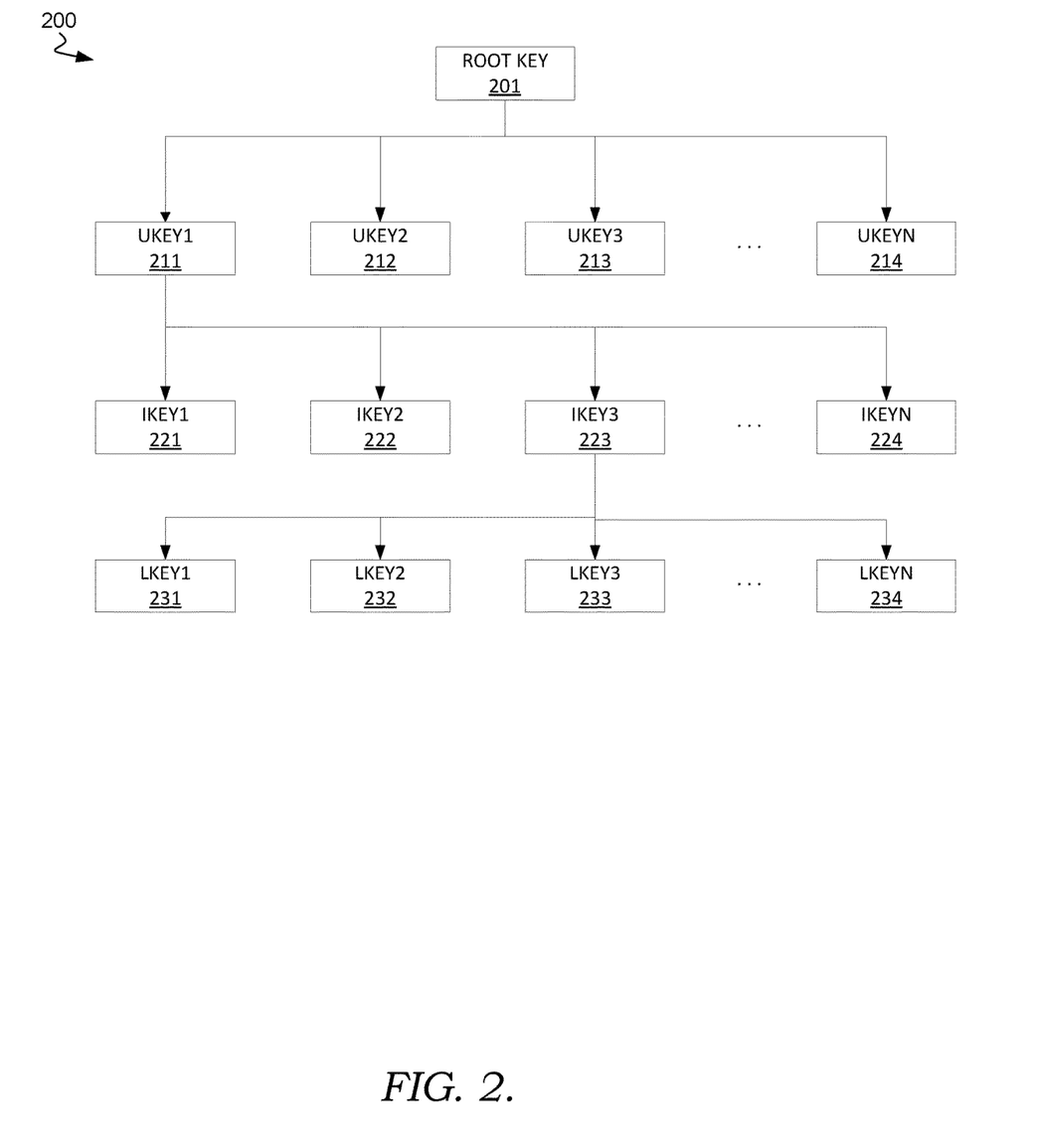
FIG. 2 is a block diagram of a hierarchy of cryptographic keys, in accordance with an aspect of the technology described herein.

Turning now to FIG. 2, an example cryptographic key hierarchy 200 is shown in accordance with aspects of the technology described herein. The cryptographic key hierarchy 200 may be considered a cryptographic key generation path or guide, rather than a data store for cryptographic keys. The cryptographic path chosen specifies the two cryptographic keys that need to be generated in order to use as input to generate a cryptographic key that is actually used to encrypt data. The cryptographic key hierarchy 200 includes four levels. The root key 201 is at the top level. The nodes of the cryptographic key hierarchy may exist as potential locations when the corresponding cryptographic key is not yet generated and used locations (or paths) after generation. The root key 201 may be provided at manufacture or configuration of the SoC 100 and used for multiple purposes within the SoC 100. In aspects, the root key 201 is not generated as part of the cryptographic key hierarchy 200, but pre-exists on the SoC 100.

Immediately below the root key 201 is a plurality of keys, described herein as upper keys. Four keys are shown on the upper level, but aspects of the technology described herein are not limited to implementations with four keys. The four upper keys include upper key one 211, upper key two 212, upper key three 213, and upper key N 214. The inclusion of upper key N 214 is meant to emphasize that different amount of keys can be generated at each level according to the choice of the designer. For example, in one aspect, the upper level includes 16 keys. The root key 201 is an input to cryptographic function used to generate the upper keys.

Immediately below the upper keys is a plurality of keys, described herein as intermediate keys. A plurality of intermediate keys may leaf from each upper key. Four intermediate keys are shown leafing from upper key one 211, but aspects of the technology described herein are not limited to implementations with four keys. The four intermediate keys include intermediate key one 221, intermediate key two 222, intermediate key three 223, and intermediate key N 224. The inclusion of intermediate key N 224 is meant to emphasize that different amount of keys can be generated at each level according to the choice of the designer. For example, in one aspect, the intermediate level includes 256 keys. The upper keys, such as upper key one 211, are inputs to the cryptographic function used to generate the intermediate keys.

Immediately below the intermediate keys is a plurality of keys, described herein as lower keys. A plurality of lower keys may leaf from each intermediate key. Four upper keys are shown leafing from intermedia key three 223, but aspects of the technology described herein are not limited to implementations with four keys. The four lower level keys include lower key one 231, lower key two 232, lower key three 233, and lower key N 234. The inclusion of lower key N 234 is meant to emphasize that different amount of keys can be generated at each level according to the choice of the designer. For example, in one aspect, the lower level includes 4096 keys. The intermedia keys, such as intermediate key three 233, are inputs to the cryptographic function used to generate the lower keys. In aspects, the lower keys are used to encrypt (and decrypt) memory on the SoC 101.

Each cryptographic key location may be associated with a location identifier. Different nomenclatures may be possible for use with the technology. In one aspect, a six-digit identifier is used to represent each location in the cryptographic key hierarchy 200. The first two digits represent the upper level location, the next two digits represent the intermediate location, and the final two digits represent the lower location. Thus, a location identifier for lower key two 232 may be 010302. The "01" in 010302 represents upper key one 211, which is in the first position in the upper level. The "03" in 010302 represents intermediate key three 223, which is in the third position in the intermediate level. The "02" in 010302 represents lower key two 232, which is in the second position in the intermediate level. These location representations may be used as an input to the cryptographic function used to generate the corresponding cryptographic key.

Iteration manager 144 determines a level specific amount of iterations to be performed. In an aspect, the level-specific amount of iterations is determined using a range of bits in the unique identifier for the SoC 101. Each key may be generated using a prescribed amount of iterations performed across the various hierarchical levels of the cryptographic key hierarchy. For example, each lower key may be generated using a total of 64 iterations across all iterations in the hierarchical path of keys that leads to the lower key.

The per-hierarchical level number of iterations may be determined on a chip-by-chip basis using a range of bits in a unique identifier for the chip. In one example, the amount of iterations on the upper level of the hierarchy is determined using a range of the four least significant digits of the unique identifier. The amount of iterations on the intermediate level of the hierarchy may be determined using a range of the ninth through fifth least significant digits in the unique identifier. The amount of iterations in the lower (and final) level may be a designated amount (e.g., 64) less the sum of the iterations performed while generating keys in the hierarchical path leading to the key being generated. This method enables level-specific iteration amounts to vary from chip to chip.

The salt generator 146 generates a cryptographic salt that is used as an input to a cryptographic function. In this case, the cryptographic salt is the root key concatenated with the unique identifier. Adding the unique identifier to the root key improves the probability that the salt is unique in the event the same root key is generated for multiple.

The cryptographic function 148 generates a cryptographic key in response to receiving an input. In an aspect, a Pseudo Random Function (PRF) is used as the cryptographic function. A PRF is a deterministic function that produces a random output. An example of a PRF is a keyed Flash-based Message Authentication Code (FIMAC).

The input to the cryptographic function for a given location in the cryptographic hierarchy is a location-specific representation concatenated with the cryptographic salt and the cryptographic key from the parent node. In the case of upper level keys, the root key 201 is used as input as a parent node. The cryptographic function is then executed a level-specific amount of iterations to generate the cryptographic key for a location.

By way of example, the input provided to the cryptographic function to generate the upper key one 211 is the root key 201 and the salt (e.g., unique identifier concatenated with a location representation (e.g., 010000) for the upper key one 211). The input provided to the cryptographic function to generate the intermediate key three 223 is the upper key one 211 and the salt (e.g., unique identifier concatenated with a location representation (e.g., 010300) for the intermediate key three 223). The input provided to the cryptographic function to generate the lower key two 232 is the intermediate key three 223 and the salt (e.g., unique identifier concatenated with a location representation (e.g., 010302) for the lower key two 232).

The encryptor 150 can encrypt data using various forms of encryption. Advanced Encryption Standard (AES) with 256-bit keys is one type of encryption that may be used. AES-256 encryption uses the 256-bit key length to encrypt as well as decrypt a block of memory content. In all encryption, each unit of data is replaced by a different unit according to the security key used. AES is a substitution-permutation network that uses a key expansion process where the initial key is used to come up with new keys called round keys. The round keys are generated over multiple rounds of modification. Each round makes it harder to break the encryption. The AES-256 encryption uses 14 such rounds.

The encryptor 150 may include a decryptor. Decryption is the process of converting ciphertext back to plaintext. In the case of AES-256 decryption, the process begins with the inverse round key. The algorithm then reverses every action, namely: shifting rows, byte substitution, and column mixing, until it deciphers the original memory content.

Example Methods

Figure 3:
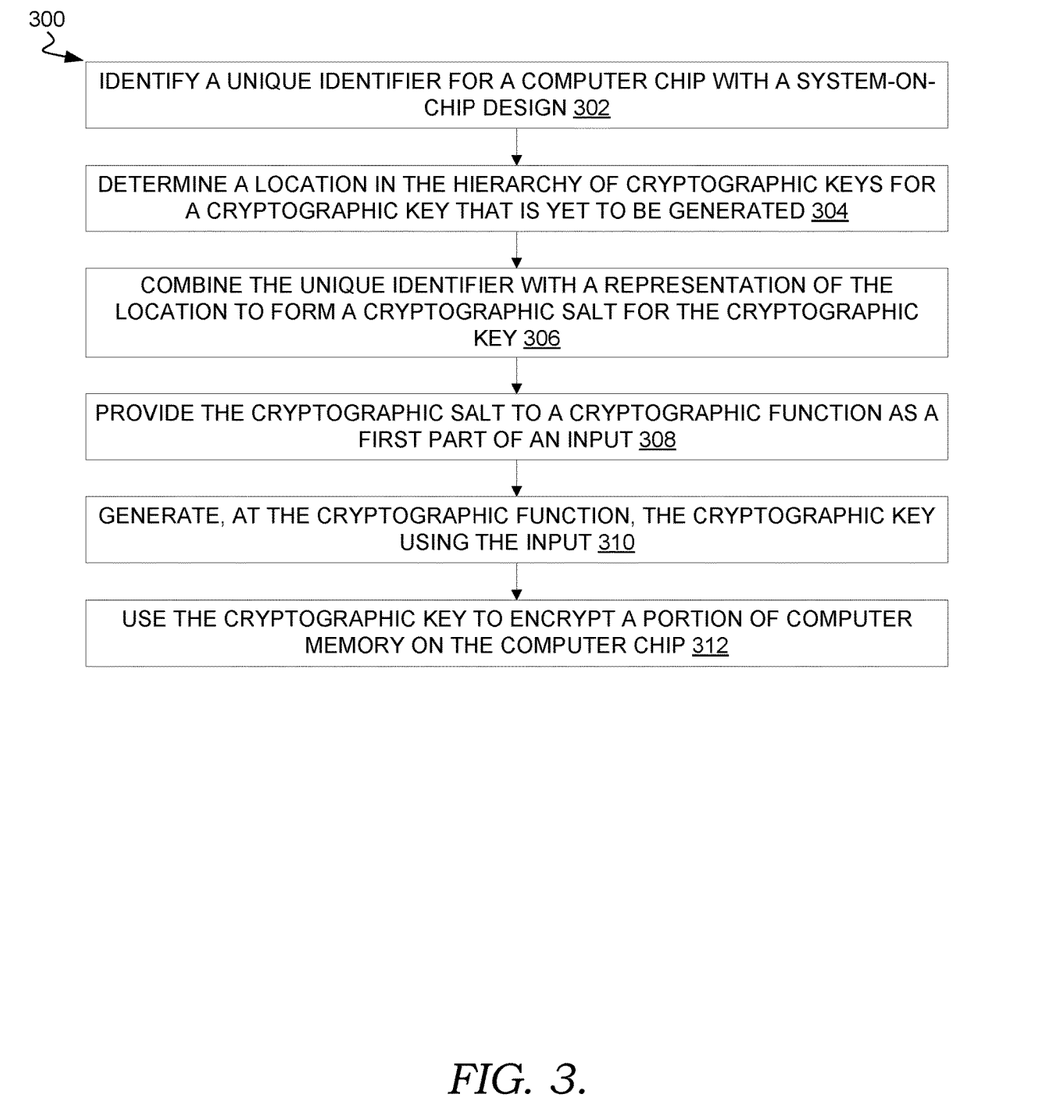
FIG. 3 is a flow diagram showing a method of generating a hierarchy of cryptographic keys, in accordance with an aspect of the technology described herein.
Figure 4:
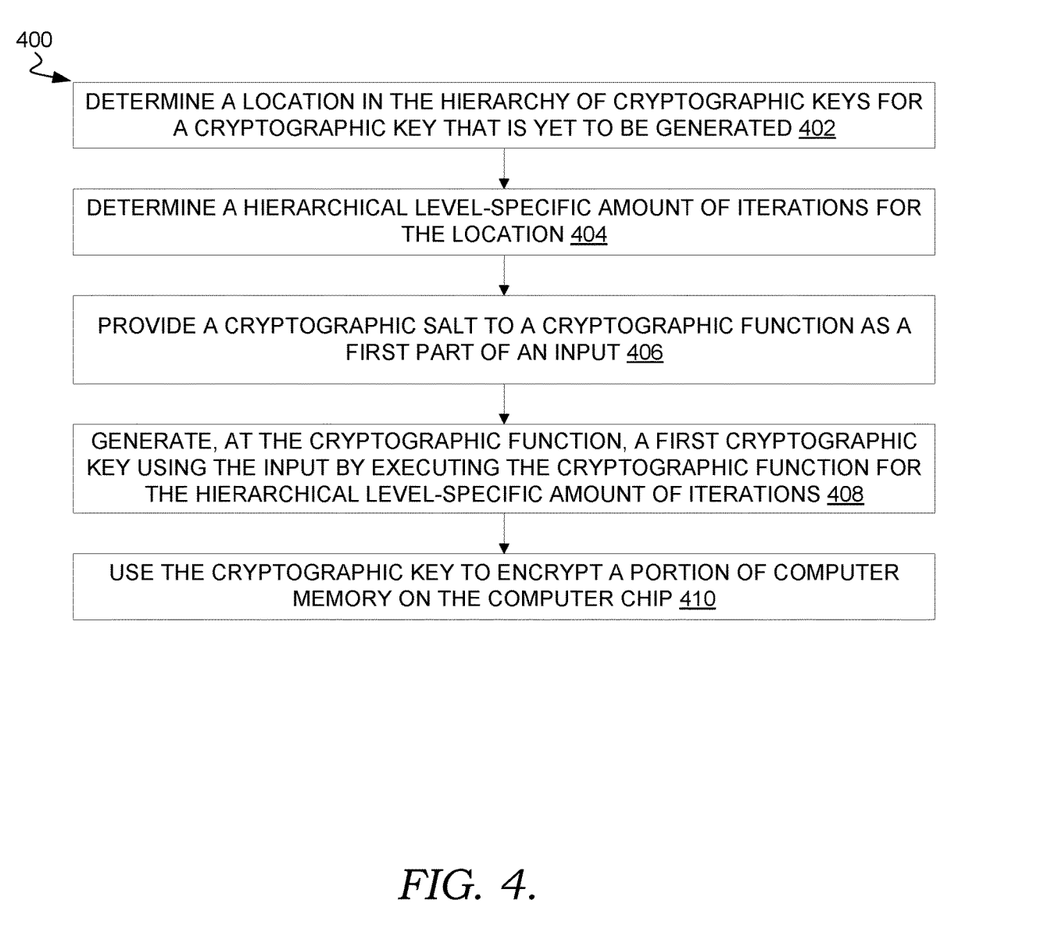
FIG. 4 is a flow diagram showing a method of secure communication, in accordance with an aspect of the technology described herein.
Figure 5:
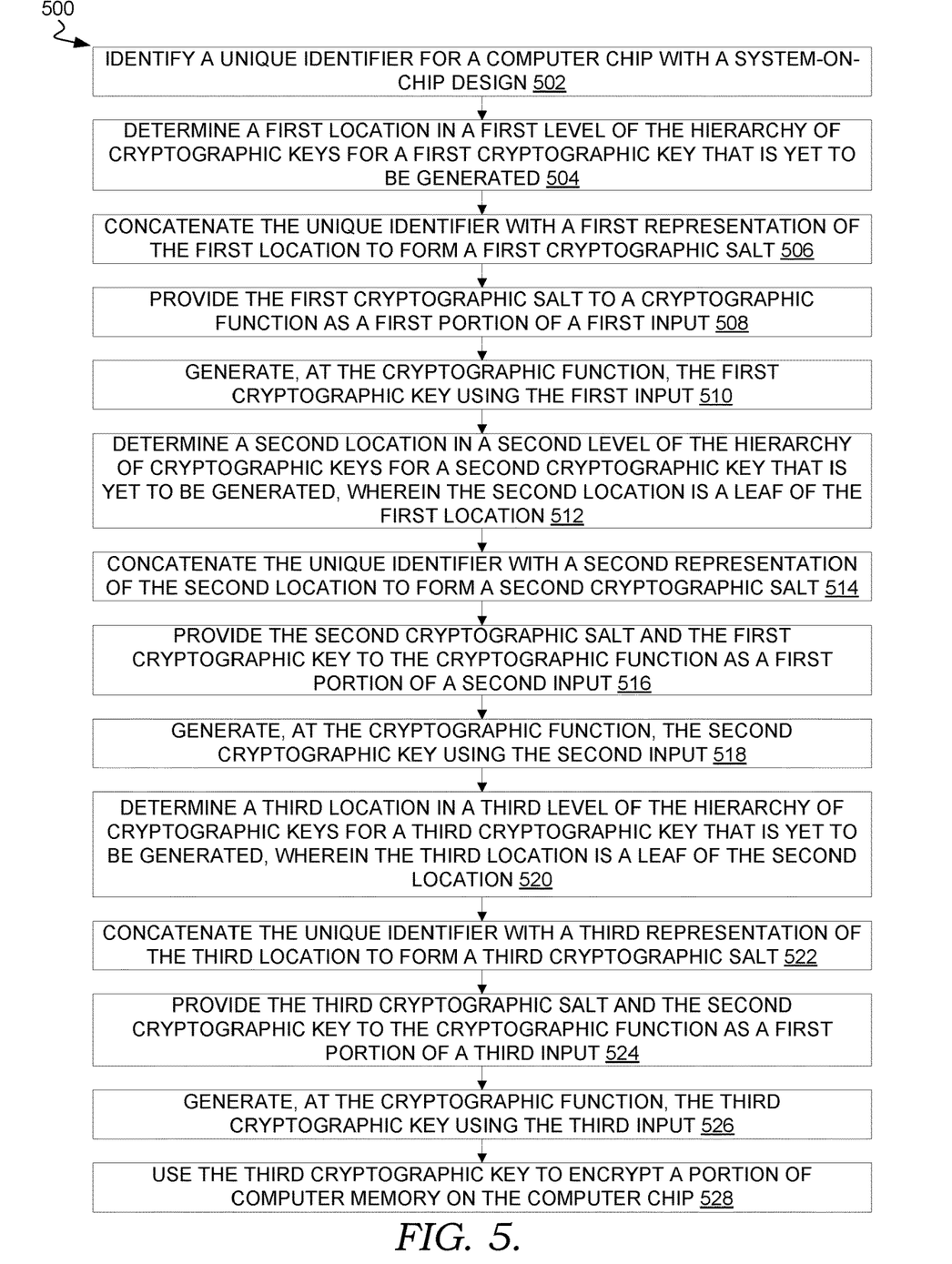
FIG. 5 is a flow diagram showing a method of secure communication, in accordance with an aspect of the technology described herein.

Now referring to FIGS. 3, 4 and 5, each block of methods 300, 400, and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 300, 400, and 500 are described, by way of example, with respect to FIGS. 1-2. However, these methods may additionally or alternatively be executed by any one system, or any combination of systems, including, but not limited to, those described herein.

FIG. 3 is a flow diagram showing a method 300 of generating a hierarchy of cryptographic keys, in accordance with some embodiments of the present disclosure. Method 300 may be performed on or with systems similar to those described with reference to FIGS. 1-2.

At step 310, the method 300 includes identifying a unique identifier for a computer chip with a system-on-chip design. A random identifier is burned into each processor at manufacturing. This value may not be readable by firmware or software and is directly read by the processor's hardware. In an aspect, the random identifier is a 256-bit random identifier. The random identifier may be combined with a random secret at every power up of the SoC to create a power-cycle specific unique identifier that is only valid for that power cycle. This further diversifies the keys that are generated and makes them unique every power cycle. In aspects, the unique identifier identified at step 310 may be either the random identifier burned into the processor or the power-cycle specific unique identifier.

At step 320, the method 300 includes determining a location in the hierarchy of cryptographic keys for a cryptographic key that is yet to be generated. As explained, generated keys may be tracked in a key record. The determination of a location may be selected from available locations (e.g., locations where keys have not been generated) using any of several methods. In one aspect, the selection is random. In another aspect, the selection is sequential, such that the next available location on the hierarchy is selected from left to right.

At step 330, the method 300 includes combining the unique identifier with a representation of the location to form a cryptographic salt for the cryptographic key. At step 340, the method 300 includes providing the cryptographic salt to a cryptographic function as a first part of an input. The second part of the input may be a cryptographic key associated with a parent node for the location. If an upper level key is being generated, then the root key may be used.

At step 350, the method 300 includes generating, at the cryptographic function, the cryptographic key using the input. In addition, the cryptographic function may be executed a level-specific amount of iterations. At step 360, the method 300 includes using the cryptographic key to encrypt a portion of computer memory on the computer chip.

FIG. 4 is a flow diagram showing a method 400 generating a hierarchy of cryptographic keys on a computer chip with a system-on-chip design, in accordance with some embodiments of the present disclosure. Method 400 may be performed on or with systems similar to those described with reference to FIGS. 1-2.

At step 410, the method 400 includes determining a location in the hierarchy of cryptographic keys for a cryptographic key that is yet to be generated. As explained, generated keys may be tracked in a key record. The determination of a location may be selected from available locations (e.g., locations where keys have not been generated) using any of several methods. In one aspect, the selection is random. In another aspect, the selection is sequential, such that the next available location on the hierarchy is selected from left to right.

At step 420, the method 400 includes determining a hierarchical level-specific amount of iterations for the location. The hierarchical level-specific number of iterations may be determined on a chip-by-chip basis using a unique identifier for the chip. In one example, the amount of iterations on the upper level of the hierarchy is determined using the four least significant digits of the unique identifier. The amount of iterations on the intermediate level of the hierarchy may be determined using the ninth through fifth least significant digits in the unique identifier. The amount of iterations in the lower (and final) level may be a designated amount (e.g., 64) less the sum of the iterations performed while generating keys in the hierarchical path leading to the key being generated. This method enables level-specific iteration amounts to vary from chip to chip.

At step 430, the method 400 includes providing a cryptographic salt to a cryptographic function as a first part of an input. The second part of the input may be a cryptographic key associated with a parent node for the location. If an upper level key is being generated, then the root key may be used. At step 440, the method 400 includes generating, at the cryptographic function, a first cryptographic key using the input by executing the cryptographic function for the hierarchical level-specific amount of iterations. At step 450, the method 400 includes using the cryptographic key to encrypt a portion of computer memory on the computer chip.

FIG. 5 is a flow diagram showing a method 500 generating a hierarchy of cryptographic keys, in accordance with some embodiments of the present disclosure. Method 500 may be performed on or with systems similar to those described with reference to FIGS. 1-2.

At step 502, the method 500 includes identifying a unique identifier for a computer chip hosting a system-on-chip device. A random identifier is burned into each processor at manufacturing. This value may not be readable by firmware or software and is directly read by the processor's hardware. In an aspect, the random identifier is a 256-bit random identifier. The random identifier may be combined with a random secret at every power up of the SoC to create a power-cycle specific unique identifier that is only valid for that power cycle. This further diversifies the keys that are generated and makes them unique every power cycle. In aspects, the unique identifier identified at step 502 may be either the random identifier burned into the processor or the power-cycle specific unique identifier.

At step 504, the method 500 includes determining a first location in a first level of the hierarchy of cryptographic keys for a first cryptographic key that is yet to be generated. As explained, generated keys may be tracked in a key record. The determination of a location may be selected from available locations (e.g., locations where keys have not been generated) using any of several methods. In one aspect, the selection is random. In another aspect, the selection is sequential, such that the next available location on the hierarchy is selected from left to right.

At step 506, the method 500 includes combining the unique identifier with a first representation of the first location to form a first cryptographic salt. At step 508, the method 500 includes providing the first cryptographic salt to a cryptographic function as a first portion of a first input. The second part of the input may be the root key. At step 510, the method 500 includes generating, at the cryptographic function, the first cryptographic key using the first input. The cryptographic function may be executed a level-specific amount of iterations.

At step 512, the method 500 includes determining a second location in a second level of the hierarchy of cryptographic keys for a second cryptographic key that is yet to be generated. The second location is a leaf of the first location. The location selection has been described previously. At step 514, the method 500 includes combining the unique identifier with a second representation of the second location to form a second cryptographic salt. At step 516, the method 500 includes providing the second cryptographic salt and the first cryptographic key to the cryptographic function as a first portion of a second input. At step 518, the method 500 includes generating, at the cryptographic function, the second cryptographic key using the second input. The cryptographic function may be executed a level-specific amount of iterations.

At step 520, the method 500 includes determining a third location in a third level of the hierarchy of cryptographic keys for a third cryptographic key that is yet to be generated. The third location is a leaf of the second location. The location selection has been described previously. At step 522, the method 500 includes combining the unique identifier with a third representation of the third location to form a third cryptographic salt. At step 524, the method 500 includes providing the third cryptographic salt and the second cryptographic key to the cryptographic function as a first portion of a third input. At step 526, the method 500 includes generating, at the cryptographic function, the third cryptographic key using the third input. The cryptographic function may be executed a level-specific amount of iterations.

At step 528, the method 500 includes using the third cryptographic key to encrypt a portion of computer memory on the computer chip.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

The SoC 100 includes a variety of computer-readable media. Computer-readable media may be any available media that may be accessed by SoC 100 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

EMBODIMENTS

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A method of generating a hierarchy of cryptographic keys comprising:
   identifying a unique identifier for a computer chip with a system-on-chip design;
   determining a location in the hierarchy of cryptographic keys for a cryptographic key that is yet to be generated;
   determining, using the unique identifier, a hierarchical level-specific amount of iterations for the location;
   combining the unique identifier with a representation of the location to form a cryptographic salt for the cryptographic key;
   providing the cryptographic salt to a cryptographic function as a first part of an input;
   generating, at the cryptographic function, the cryptographic key using the input, wherein the cryptographic function is executed the hierarchical level-specific amount of iterations when generating the cryptographic key; and using the cryptographic key to encrypt a portion of computer memory on the computer chip.

2. The method of claim 1, wherein a root key is a second part of the input.

3. The method of claim 1, wherein the unique identifier is burned into a processor on the computer chip at manufacturing.

4. The method of claim 3, wherein the hierarchical level-specific amount of iterations is based on a range of bits in a root key.

5. The method of claim 4, wherein the range of bits for a first level is the four least significant digits in the root key.

6. The method of claim 4, wherein the hierarchical level-specific amount of iterations at a lowest level of the hierarchy of cryptographic keys is a designated amount less a sum of all hierarchical level-specific amounts for levels above the lowest level.

7. The method of claim 1, wherein the cryptographic key is generated on as needed in response to detecting a trigger event.

8. A method of generating a hierarchy of cryptographic keys on a computer chip with a system-on-chip design, the method comprising:
determining a location in the hierarchy of cryptographic keys for a cryptographic key that is yet to be generated;
determining, using a unique identifier for the computer chip, a hierarchical level-specific amount of iterations for the location;
providing a cryptographic salt to a cryptographic function as a first part of an input;
generating, at the cryptographic function, a first cryptographic key using the input by executing the cryptographic function for the hierarchical level-specific amount of iterations; and
using the cryptographic key to encrypt a portion of computer memory on the computer chip.

9. The method of claim 8, further comprising:
identifying a unique identifier for the computer chip; and
combining the unique identifier with a representation of the location to form the cryptographic salt.

10. The method of claim 8, wherein a root key is a second part of the input.

11. The method of claim 8, wherein the hierarchical level-specific amount of iterations is based on a range of bits in a root key.

12. The method of claim 11, wherein the range of bits for a first level is the four least significant digits in the root key.

13. The method of claim 11, wherein the hierarchical level-specific amount of iterations at a lowest level of the hierarchy of cryptographic keys is a designated amount less a sum of all hierarchical level-specific amounts for levels above the lowest level.

14. A computer-storage media having computer executable instructions embodied thereon that when executed by a computing device, cause the computing device to perform a method of generating a hierarchy of cryptographic keys, the method comprising:
identifying a unique identifier for a computer chip hosting a system-on-chip design;
determining a first location in a first level of the hierarchy of cryptographic keys for a first cryptographic key that is yet to be generated;
combining the unique identifier with a first representation of the first location to form a first cryptographic salt;
providing the first cryptographic salt to a cryptographic function as a first portion of a first input;
generating, at the cryptographic function, the first cryptographic key using the first input;
determining a second location in a second level of the hierarchy of cryptographic keys for a second cryptographic key that is yet to be generated, wherein the second location is a leaf of the first location;
combining the unique identifier with a second representation of the second location to form a second cryptographic salt;
providing the second cryptographic salt and the first cryptographic key to the cryptographic function as a first portion of a second input;
generating, at the cryptographic function, the second cryptographic key using the second input;
determining a third location in a third level of the hierarchy of cryptographic keys for a third cryptographic key that is yet to be generated, wherein the third location is a leaf of the second location;
combining the unique identifier with a third representation of the third location to form a third cryptographic salt;
providing the third cryptographic salt and the second cryptographic key to the cryptographic function as a first portion of a third input;
generating, at the cryptographic function, the third cryptographic key using the third input; and
using the third cryptographic key to encrypt a portion of computer memory on the computer chip.

15. The media of claim 14, wherein a root key is a second portion of the first input, the second input, and the third input.

16. The media of claim 14, further comprising:
determining a hierarchical level-specific amount of iterations for the first location; and
wherein the cryptographic function is executed the hierarchical level-specific amount of iterations when generating the first cryptographic key.

17. The media of claim 16, wherein the hierarchical level-specific amount of iterations is based on a range of bits in a root key.

18. The media of claim 17, wherein the hierarchical level-specific amount of iterations at the third level of the hierarchy of cryptographic keys is a designated amount less a sum of all hierarchical level-specific amounts for the first level and the second level.

19. The media of claim 14, wherein the cryptographic function is a pseudo random function.

20. The media of claim 14, wherein the unique identifier is burned into a processor on the computer chip at manufacturing.

* * * * *